3,395,953
DEVICE FOR POSITIONING SEALING MEANS
FOR AN ANTIFRICTION BEARING
Alfred Pitner, Paris, France, assignor to Nadella S.A., Rueil-Malmaison, Hauts-de-Seine, France, a French body corporate
Filed Oct. 12, 1964, Ser. No. 403,302
Claims priority, application France, Oct. 17, 1963, 950,966
10 Claims. (Cl. 308—187.1)

ABSTRACT OF THE DISCLOSURE

A temporary preassembly for engaging a rolling bearing and annular sealing means therefor with a cylindrical surface of a machine part, the preassembly consisting of a subassembly including the rolling bearing and the annular sealing means therefor, and an additional temporary sleeve coaxial and circumferentially coextensive with and engaging the subassembly, retaining means extending radially from each end of the sleeve for temporarily retaining the subassembly, the retaining means being yieldable at one end of the sleeve to allow the subassembly to be axially disengaged as a unit from the sleeve without permanent deformation of the subassembly.

---

The present invention relates to antifriction bearings with which are combined sealing means for protecting the bearing against penetration of foreign bodies and/or maintaining a lubricant inside the bearings.

These sealing means can be part of a mechanical system in which the bearing is finally mounted, form part of the bearing itself or be independent from the mechanical system and bearing before final assembly.

The first case is met with in exceptional circumstances, for example when it is possible and advantageous to provide a labyrinth seal.

Constructing sealing means which are unitary with the bearing is at first sight advantageous and rational. It has indeed the advantage of facilitating handling since as the bearing is unitary with its sealing means the bearing and sealing means can be placed in position in a single operation.

However, the incorporation of sealing elements in a bearing gives rise to the following drawbacks:

(a) The sealing lips of the sealing element must be orientated in a direction which varies with the particular conditions of utilization and this requires the construction of different assemblies.

(b) Any false manipulation when mounting harms the seal, which is in part fragile, and this discourages the use of costly assembly of the sealing element and bearing.

(c) In different applications of the same bearing there might be need for sealing elements only on one side or the other of the bearing or on both sides, and this requires the construction of three different assemblies.

Further, in bearings having a small radial extent, and in particular needle bearings or bearing having long rollers, it is somewhat difficult and costly to incorporate therein an efficient seal since the best seals are obtained by means of lips composed of suitable materials which are in contact with a facing surface; these lips must possess a certain flexibility to insure this contact in an efficient manner. It is difficult to construct them within a bearing having rolling elements of very small diameter.

Owing to the disadvantages mentioned hereinbefore, it is the third solution, namely the separate construction and mounting of the bearings and sealing means necessary for their operation, which is usually adopted. To remedy the complication of handling and mounting in such a solution, there has already been proposed preassembly by lateral adhesion of the sealing elements on one of the rings of the bearing, but this is a costly and rather unreliable solution.

The object of the invention is to effect, under both cheap and reliable conditions, a preassembly of a bearing and the sealing means thereof owing to the use of an additional temporary sleeve in which or on which the subassembly consisting of the bearing and the corresponding sealing elements is fixed. The sleeve protects the sealing element or elements and permits an easy handling of the bearing and sealing elements subassembly. It is extremely easy to place this subassembly in position in a bore or on a shaft. This is normally achieved by urging the subassembly in the axial direction, for example by means of a mandrel, and by separating it from the sleeve which is previously placed in supporting contact with an adjacent edge of the bore or shaft.

The sleeve can be composed of any cheap material, for example plastic material or thin metal, since it is a member which acts as a temporary packing. It normally comprises at one end rigid retaining means such as a formed flange which may be continuous or discontinuous and allows a free passage for the mandrel which serves to expel the bearing and sealing element subassembly. At its other end the sleeve is provided for the purpose of preventing the contents of the sleeve from falling out, with withdrawable maintaining means, for example in the form of a contraction which is eliminated when the assembly is expelled and through which the subassembly passes under the effect of an elastic or permanent deformation of the contraction.

The sleeve can comprise centering means to facilitate the positioning thereof or be arranged to adapt itself to centering elements connected to the mechanical system in which the bearing and sealing element subassembly must be mounted.

The invention can also be applied to sealing elements of very diverse types. For example, the sealing element can be composed of plastic material or rubber or the assembly of metal or other members which afford a seal owing to a labyrinth structure.

It is possible to reinforce the sealing element or elements by a rigid part, incorporation for example of a metal member, or any other means which would reinforce its strength in such manner that when the bearing and sealing element subassembly is expelled and fitted onto or into the element receiving it, and in particular when the sealing element is disposed on the side of the subassembly where the expelling mandrel must act, the strength of this sealing element is such as to avoid any deformation harmful to its subsequent operation when finally in position. Further, the axial force exerted by the mandrel on the sealing element could be utilized so as to impart thereto a slightly different shape, for example so as to deform it in the radial direction so that, once in position, it adheres in a perfect manner by a gripping action to its support and thus affords an improved seal.

Further, in the sleeve according to the invention a sealing element can be provided solely on one side or on both sides of the bearing, or the sealing element can be different on one side or the other according to the requirements of the mounting.

As concerns the bearing itself, it can consist of a single cage having rolling elements, or rolling elements maintained in a suitable manner in an outer ring when it concerns a bore, on the inner ring when it concerns a bearing mounted on the shaft, or it can be in any other form appropriate to the loads and speeds for which the bearing is designed.

Owing to the invention, there is obtained, by means of a sleeve without precision and at low cost price, a particularly economic assembly of a bearing and a sealing system for the latter, each of which are adapted to the particular conditions of utilization, the positioning of this assembly affording finally a sealed bearing in the same way as if the sealing system were unitary with the bearing itself, but without the corresponding drawbacks.

In the ensuing description there will be given embodiments of a sleeve which support a bearing and one or two sealing elements adapted to be mounted in a bore which is provided for receiving a rotary shaft and with which the lip of the sealing element or elements comes into contact. However, it will be understood that it would be extremely easy to invert the mounting and adapt it to the case where the bearing and its sealing means are mounted on the shaft, the outer bore affording by itself or through the medium of an element forming part thereof a surface for the sealing contact.

Figure 1:
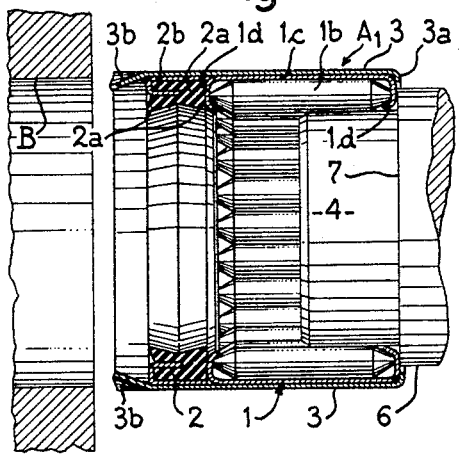
FIG. 1 is a sleeve according to the invention serving to place in a bore a subassembly consisting of a cageless needle bearing and a sealing element.

The device $A_1$ shown in FIG. 1 is adapted to place in a bore B in the preassembled condition a subassembly consisting of a needle bearing 1 and a sealing element 2 for the latter.

The sealing element 2 has two sealing lips 2a provided for application against the adjacent surface of the shaft (not shown) adapted to be mounted inside the bearing 1. It is reinforced by a reinforcement 2b embedded in the material of the sealing element.

As concerns the bearing 1, it consists of a plurality of parallel contiguous needles 1b disposed in an outer ring 1c and retained therein by the flanges 1d of the ring which are bent radially and axially for this purpose.

The bearing 1 and the sealing element 2 are fitted one behind the other in a sleeve 3 which has a generally cylindrical shape and at the respective ends of which are formed a radial flange 3a against which the ring 1c bears and radial projections 3b (two in the presently-described embodiment) which are obtained by deformation of the wall of the sleeve and retain within the latter the bearing and sealing element subassembly.

To expel this subassembly and insert it in the bore B, the end of the sleeve provided with the retaining projections 3b is placed against the edge of the bore and the end 4 of reduced diameter of a mandrel 6 is inserted in the opening of the sleeve defined by the flange 3a in such manner as to introduce this end 4 into the interior of the bearing 1 and apply the shoulder 7 of the mandrel against the adjacent end 1b of the ring. Exertion of an axial force on the mandrel causes the bearing and sealing element subassembly to be expelled from the sleeve 3 after deformation of the projections 3b which are forced outwardly.

Figure 3:
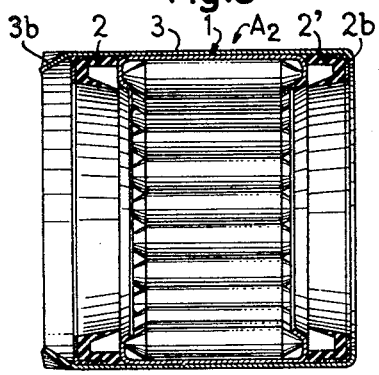
FIG. 3 is a view similar to FIG. 1, the sleeve including two sealing elements.

In the embodiment shown in FIG. 3, two sealing elements 2, 2' are provided in the sleeve 3 at each end of the bearing.

Figure 2:
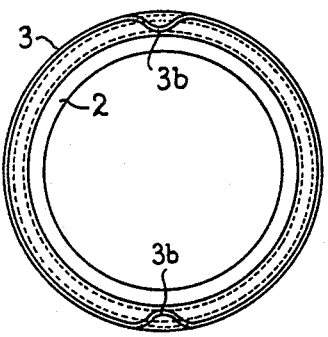
FIG. 2 is an end elevational view corresponding to FIG. 1.
Figure 4:
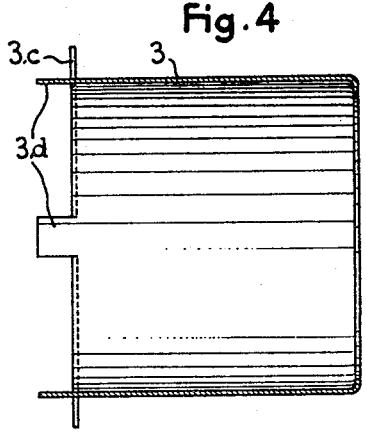
FIG. 4 is an axial sectional view of a variant of the sleeve.

FIG. 4 shows a variant of the sleeve comprising a circular flange 3c adapted to improve the seating of the sleeve against the member to be provided with the bearing, and flexible tabs 3d which replace the projections 3b shown in FIGS. 1 and 2 and permit the expulsion of the sealing element and the bearing with less effort.

Figure 5:
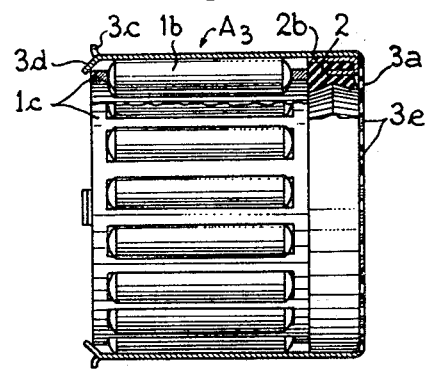
FIG. 5 is a view similar to FIG. 1 of a sleeve which carries a needle supporting cage and a sealing element.

FIG. 5 shows a bearing which has no ring and the parallel needles 1b are disposed in a cage 1c which retains them in the inward direction. In this embodiment, the expulsion of the needle cage is obtained through the single sealing element 2 which bears against the flange 3a of the sleeve. This flange is, as shown, discontinuous so as to provide a series of notches 3e through which the mandrel can bear against the reinforcement of the sealing element.

Although specific embodiments of the invention have been described, many modifications and changes may be made therein without departing from the scope of the invention as defined in the appended claims.

Having now described my invention what I claim as new and desire to secure by Letters Patent is:

1. A temporary preassembly consisting of a subassembly and an additional temporary sleeve engaged with the subassembly, the subassembly consisting of a rolling bearing associated with annular sealing means for the bearing, the bearing consisting of a plurality of parallel rollers and roller retaining means, the sleeve having a cylindrical face circumferentially and axially coextensive with and in direct engagement with the bearing and the sealing means, the sleeve comprising subassembly retaining means radially extending from each end of the cylindrical face of the sleeve in diametral planes axially adjacent the subassembly for temporarily axially retaining the subassembly, said association between the bearing and the annular sealing means therefor being such that without the sleeve and subassembly retaining means, the bearing and the sealing means would be loosely associated and free to fall apart from each other in any direction relative to the rolling bearing, the sealing means having a periphery radially remote from the cylindrical face of the sleeve which periphery is exposed and ready to receive the corresponding part of a structure with which the bearing and the sealing means are intended to be assembled, and the subassembly retaining means being radially yieldable at one end of the cylindrical face of the sleeve to allow the subassembly to be axially disengaged from the sleeve without permanent deformation of the subassembly upon exertion of axial thrust on the subassembly.

2. A temporary preassembly consisting of a subassembly and an additional temporary sleeve encompassing the subassembly, the subassembly consisting of a rolling bearing associated with annular sealing means for the bearing, the bearing consisting of a plurality of parallel rollers and roller retaining means, the sleeve being open at both ends and having an inner cylindrical face axially coextensive with and in direct engagement with the bearing and the sealing means, the sleeve comprising subassembly retaining means radially extending from each end of the cylindrical face of the sleeve in diametral planes axially adjacent the subassembly for temporarily axially retaining the subassembly, said association between the bearing and the annular sealing means therefor being such that without the sleeve and subassembly retaining means, the bearing and the sealing means would be loosely associated and free to fall apart from each other in any direction relative to the rolling bearing, the sealing means having an inner periphery radially remote from the cylindrical face of the sleeve which periphery is exposed and ready to receive the corresponding part of a structure with which the bearing and the sealing means are intended to be assembled, and the subassembly retaining means being radially yieldable at one end of the cylindrical face of the sleeve to allow the subassembly to be axially disengaged from the sleeve without permanent deformation of the subassembly upon exertion of axial thrust on the subassembly.

3. A temporary preassembly consisting of a subassembly and an additional temporary sleeve engaged with the subassembly, the subassembly consisting of a rolling bearing associated with annular sealing means for the bearing, the bearing consisting of a plurality of parallel rollers and roller retaining means, the sleeve having a cylindrical face circumferentially and axially coextensive with and in direct engagement with the bearing and the sealing means, the sleeve comprising subassembly retaining means radially extending from each end of the cylindrical face of the sleeve in diametral planes axially adjacent the subassembly for temporarily axially retaining the subassembly, said association between the bearing and the annular sealing means therefor being such that without the sleeve and subassembly retaining means, the bearing and the sealing means would be loosely associated and free to fall apart from each other in any direction relative to the rolling bearing, the sealing means having a periphery radially remote from the cylindrical face of the sleeve which periphery is exposed and ready to receive the corresponding part of a structure with which the bearing and the sealing means are intended to be assembled, and the subassembly retaining means being radially yieldable at one end of the cylindrical face of the sleeve and comprising a flange at the other end of the cylindrical face, said flange exposing a part of the adjacent end of the subassembly to permit a force to be exerted axially of the sleeve on the subassembly for urging the subassembly beyond the radially yieldable subassembly retaining means and disengaging it from the sleeve without permanent deformation of the subassembly.

4. A temporary preassembly consisting of a subassembly and an additional temporary sleeve engaged with the subassembly, the subassembly consisting of a rolling bearing associated with annular sealing means for the bearing, the bearing including rolling elements and rolling element retaining means, the sleeve having a cylindrical face circumferentially and axially coextensively with and in direct engagement with the bearing and the sealing means, the sleeve comprising subassembly retaining means radially extending from each end of the cylindrical face of the sleeve in diametral planes axially adjacent the subassembly for temporarily axially retaining the subassembly, said association between the bearing and the annular sealing means therefor being such that without the sleeve and subassembly retaining means, the bearing and the sealing means would be loosely associated and free to fall apart from each other in any direction relative to the rolling bearing, the sealing means having a periphery radially remote from the cylindrical face of the sleeve which periphery is exposed and ready to receive the corresponding part of a structure with which the bearing and the sealing means are intended to be assembled, and the subassembly retaining means being radially yieldable at one end of the cylindrical face of the sleeve to allow the subassembly to be axially disengaged from the sleeve without permanent deformation of the subassembly upon exertion of axial thrust on the subassembly, said radially yieldable subassembly retaining means comprising a small number of radially projecting deformed portions of the sleeve which are obtained by a radial deformation of the sleeve and have a total circumferential extent which is a minor fraction of the circumference of said cylindrical face of the sleeve.

5. A temporary preassembly consisting of a subassembly and an additional temporary sleeve engaged with the subassembly, the subassembly consisting of a rolling bearing associated with annular sealing means for the bearing, the bearing consisting of a raceway-carrying bearing ring, contiguous elongated rolling elements in rolling contact with the ring, and retaining flanges on the ring for axially and radially retaining the rolling elements, the sleeve having a cylindrical face circumferentially and axially coextensive with and in direct engagement with the raceway-carrying ring and the sealing means, the sleeve comprising subassembly retaining means radially extending from each end of the cylindrical face of the sleeve in diametral planes axially adjacent the subassembly for temporarily axially retaining the subassembly, said association between the bearing and the annular sealing means therefor being such that without the sleeve and subassembly retaining means, the bearing and the sealing means would be loosely associated and free to fall apart from each other in any direction relative to the rolling bearing, the sealing means having a periphery radially remote from the cylindrical face of the sleeve which periphery is exposed and ready to receive the corresponding part of a structure with which the bearing and the sealing means are intended to be assembled, and the subassembly retaining means being radially yieldable at one end of the cylindrical face of the sleeve to allow the subassembly to be axially disengaged from the sleeve without permanent deformation of the subassembly upon exertion of axial thrust on the subassembly.

6. A temporary preassembly consisting of a subassembly and an additional temporary sleeve engaged with the subassembly, the subassembly consisting of a rolling bearing associated with annular sealing means for the bearing, the bearing consisting of rollers and a cage cooperative with and axially and radially retaining the rollers, the sleeve having a cylindrical face axially coextensive with and in direct engagement with the rollers and the sealing means, the sleeve comprising subassembly retaining means radially extending from each end of the cylindrical face of the sleeve in diametral planes axially adjacent the subassembly for temporarily axially retaining the subassembly, said association between the bearing and the annular sealing means therefor being such that without the sleeve and subassembly retaining means, the bearing and the sealing means would be loosely associated and free to fall apart from each other in any direction relative to the rolling bearing, the sealing means having a periphery radially remote from the cylindrical face of the sleeve which periphery is exposed and ready to receive the corresponding part of a structure with which the bearing and the sealing means are intended to be assembled, and the subassembly retaining means being radially yieldable at one end of the cylindrical face of the sleeve to allow the subassembly to be axially disengaged from the sleeve without permanent deformation of the subassembly upon exertion of axial thrust on the subassembly.

7. A temporary preassembly as claimed in claim 1, wherein the sealing means comprises a sealing element having a reinforcement to improve the strength of the sealing element.

8. A temporary preassembly as claimed in claim 1, wherein the sealing means comprises a sealing element having a reinforcement which is capable of being deformed upon application of an axial thrust thereon in such manner as to improve the seal afforded by the sealing element.

9. A temporary preassembly as claimed in claim 1, wherein the sealing means comprises an annular sealing element at both ends of the bearing.

10. A temporary preassembly as claimed in claim 3, wherein the flange is discontinuous.

References Cited
UNITED STATES PATENTS

| | | | |
|---|---|---|---|
| 1,238,880 | 9/1917 | Buck | 308—20 |
| 2,034,534 | 3/1936 | Pitner | 308—213 X |
| 2,715,554 | 8/1955 | Walberg | 308—187.2 |
| 2,747,949 | 5/1956 | Smith | 308—187.2 |
| 2,768,725 | 10/1956 | Foulds | 308—20 |
| 3,017,228 | 1/1962 | Baechli | 308—20 |
| 1,801,655 | 4/1931 | Brown | 308—186 X |
| 1,840,638 | 1/1932 | Scribner | 29—148.4 |
| 1,850,170 | 3/1932 | Delaval | 308—187.2 |
| 1,985,693 | 12/1934 | Robinson | 308—186 |
| 1,995,838 | 3/1935 | Buckwalter | 308—214 |
| 2,015,198 | 9/1935 | Smellie | 308—187.2 |

(Other references on following page)

UNITED STATES PATENTS

| | | | |
|---|---|---|---|
| 2,023,718 | 12/1935 | Adams | 308—187.2 |
| 2,034,537 | 3/1936 | Pitner | 308—207 |
| 2,173,250 | 9/1939 | Fay | 308—187.2 |
| 2,312,615 | 3/1943 | Allen | 29—201 |
| 2,622,944 | 12/1952 | Bergstrom | 308—187.2 |
| 2,678,245 | 5/1954 | Kirsch | 308—187.2 |
| 2,894,791 | 7/1959 | White | 308—217 |
| 3,166,362 | 1/1965 | Slaght | 308—187 X |
| 3,206,829 | 9/1965 | Schaeffler | 308—187.1 X |

FOREIGN PATENTS

| | | |
|---|---|---|
| 878,279 | 9/1961 | Great Britain. |

MARTIN P. SCHWADRON, *Primary Examiner.*

L. L. JOHNSON, *Assistant Examiner.*

UNITED STATES PATENT OFFICE
CERTIFICATE OF CORRECTION

Patent No. 3,395,953                    Dated  August 6, 1968

Inventor(s)    Alfred Pitner

It is certified that error appears in the above-identified patent and that said Letters Patent are hereby corrected as shown below:

In the heading, column 1, line 4, --of one-half interest-- should be inserted after "assignor".

SIGNED AND
SEALED
OCT 27 1970

(SEAL)
Attest:

Edward M. Fletcher, Jr.
Attesting Officer

WILLIAM E. SCHUYLER, JR.
Commissioner of Patents